United States Patent [19]
Ishii et al.

[11] Patent Number: 5,848,381
[45] Date of Patent: Dec. 8, 1998

[54] DECISION SYSTEM FOR DETERMINING SENSOR FAILURE OF TEMPERATURE SENSOR IN AUTOMOBILE APPLICATIONS

[75] Inventors: Shigeru Ishii; Yoshihide Shinso; Tateki Jozaki, all of Kanagawa, Japan

[73] Assignee: Nissan Motor Co., Ltd., Yokohama, Japan

[21] Appl. No.: 941,697

[22] Filed: Oct. 1, 1997

[30] Foreign Application Priority Data

Oct. 3, 1996 [JP] Japan ..................... 8-263028

[51] Int. Cl.⁶ .................. G05B 23/00; G01K 7/00
[52] U.S. Cl. .................. 702/99; 701/29; 701/31; 701/34; 701/35; 73/766
[58] Field of Search .................. 701/29, 31, 34, 701/35; 73/766; 702/99

[56] References Cited

U.S. PATENT DOCUMENTS

| | | | |
|---|---|---|---|
| 4,780,826 | 10/1988 | Nakano et al. | 364/431.03 |
| 4,817,418 | 4/1989 | Asami et al. | 73/118.1 |
| 5,235,527 | 8/1993 | Ogawa et al. | 364/571.05 |
| 5,243,852 | 9/1993 | Morita | 73/117.3 |
| 5,454,259 | 10/1995 | Ishii et al. | 73/118.1 |
| 5,551,396 | 9/1996 | Suzuki et al. | 123/399 |
| 5,694,897 | 12/1997 | Kaji | 123/339.15 |

FOREIGN PATENT DOCUMENTS

57-161357 10/1982 Japan.
58-203263 11/1983 Japan.

*Primary Examiner*—John E. Barlow, Jr.
*Assistant Examiner*—Hien Vo
*Attorney, Agent, or Firm*—Foley & Lardner

[57] ABSTRACT

A sensor-failure decision system for determining a sensor failure of an automobile temperature sensor, comprises a first memory section adapted to receive input information indicative of a temperature of working fluid used in the automotive power train component part and detected by the automobile temperature sensor, a second memory section for storing a predetermined normal temperature region and a plurality of predetermined partitioned temperature regions which are obtained by partitioning a specified temperature region being lower than and continuous with the predetermined normal temperature region into a plurality of temperature regions, and a timer for measuring an elapsed time during which the temperature detected by the automobile temperature sensor is continually included in either one of the partitioned temperature regions. Also provided is a sensor-failure decision section for determining that a sensor failure of the automobile temperature sensor is present when the elapsed time measured by the timer reaches a predetermined time duration.

8 Claims, 5 Drawing Sheets

DECISION SYSTEM FOR DETERMINING SENSOR FAILURE OF TEMPERATURE SENSOR IN AUTOMOBILE APPLICATIONS

The contents of Japanese Patent Provisional Application No. 8-263028, filed Oct. 3, 1996, in Japan is hereby incorporated by reference.

BACKGROUND OF THE INVENTION

1. Field of the Invention

The present invention relates to a decision system for determining or diagnosing a sensor failure of an automobile temperature sensor such as an oil-temperature sensor being used to detect a temperature of working fluid circulating in an automotive power train (particularly an automatic transmission), a water temperature sensor being used to detect an engine temperature (for example a temperature of engine coolant circulating in an internal combustion engine), or the like.

2. Description of the Prior Art

For instance, Japanese Patent Provisional Publication Nos. 57-161357 and 58-203263 disclose two different automobile temperature sensors which detect a temperature of working fluid used in a power train such as an automatic transmission. A lock-up controller for a lock-up type automatic transmission disclosed in the Japanese Patent Provisional Publication No. 57-161357 is electronically connected to an oil temperature sensor, constructed by a thermistor which is attached to the transmission case for detecting a temperature of working fluid used in the automatic transmission, for properly controlling a lock-up release timing of a lock-up mechanism employed in the lock-up type automatic transmission in consideration of the working-oil temperature. The resistance value of the thermistor varies depending on variations in temperature of working oil whose temperature correlates with a coefficient of viscosity of working oil. Generally, a temperature rise causes a decrease in the resistance value of the thermistor (negative characteristic value). The negative type thermistor is more common to automotive applications. The lock-up controller utilizes a working-oil temperature indicative signal which is obtained by picking up the change in the resistance of the thermistor as a voltage signal by way of a pull-up resistor, to assure an optimal lock-up release timing. As is generally known, the detected working-oil temperature of the automatic transmission is generally correlative with the engine-coolant temperature which is usually detected by a water temperature sensor. On the other hand, the Japanese Patent Provisional Publication No. 58-203263 teaches inhibiting a torque converter from being brought into a locked-up state if the temperature of working oil used in the automatic transmission is below a predetermined threshold value even when predetermined conditions, such as a vehicle speed above a given value, necessary for shifting the torque converter to its locked-up state are satisfied. In case of the Japanese Patent Provisional Publication No. 58-203263, the temperature information of working oil is detected by an oil temperature sensor constructed by a thermo switch which is attached to an automatic transmission in place. The thermo switch is designed to be maintained in its closed state to generate a first working-oil temperature indicative signal of a low signal level until the temperature of working oil rises up to a set temperature, and to be shifted to its open state to generate a second working-oil temperature indicative signal of a high signal level as soon as the working-oil temperature exceeds the set temperature. Each of the lock-up controllers disclosed in the Japanese Patent Provisional Publication Nos. 57-161357 and 58-203263 does not employ a particular device for deciding a sensor failure or an abnormal condition of a temperature sensor. According to a typical method for determining the presence or absence of an oil temperature sensor failure, a decision circuitry determines that the temperature sensor failure is present in the event that the value of the oil-temperature indicative signal generated from the temperature sensor is continued out of a preset normal oil temperature region (for example $-10°$ C. through $180°$ C.) for a predetermined time duration (e.g., 10 minutes) or more. According to the conventional logic for determining a temperature sensor failure, it is possible to determine that a sensor failure is present, when the resistance value of the thermistor type temperature sensor becomes varied to a value equivalent to an excessive low temperature for example $-50°$ C. owing to breakage in the thermistor itself. However, in the event that the thermistor has broken with a resistance value equivalent to a certain temperature (e.g., $-5°$ C.) included within the preset normal oil temperature region ($-10°$ C. through $180°$ C.), the conventional logic may erroneously determine that the sensor failure is absent and the sensor operates normally, because the oil-temperature indicative signal value ($-5°$ C.) is included within the predetermined normal temperature region. Such erroneous determination for the sensor failure disturbs a satisfactory over-drive control and/or a satisfactory lock-up control. As discussed above, in the case that the thermistor has broken with a resistance value equivalent to a temperature (e.g., $-5°$ C.) included within the preset normal temperature region, such a sensor failure cannot be detected. In the case that such an erroneous determination has been made, the conventional temperature sensor failure decision circuitry or the conventional logic never emits an alarm such as buzzing sound or flashes the warning lamp on and off to warn the vehicle occupants (or the driver) that the temperature sensor does not operate accurately.

SUMMARY OF THE INVENTION

Accordingly, it is an object of the invention to provide a decision system for determining a sensor failure of a temperature sensor, mounted on an automotive vehicle for detecting a temperature of working fluid used in an automotive power-train component part (particularly an automatic transmission), which avoids the aforementioned disadvantages of the prior art.

In order to accomplish the aforementioned and other objects of the present invention, a sensor-failure decision system for determining a sensor failure of an automobile temperature sensor mounted on an automobile to detect a temperature of an automotive power train, comprises a first memory section adapted to receive input information indicative of a temperature of the automotive power train detected by the automobile temperature sensor, a second memory section for storing a predetermined normal temperature region and a plurality of predetermined partitioned temperature regions which are obtained by partitioning a specified temperature region being lower than and continuous with the predetermined normal temperature region into a plurality of temperature regions, a measurement section for measuring an elapsed time during which the temperature detected by the automobile temperature sensor is continually included in either one of the plurality of predetermined partitioned temperature regions, and a sensor-failure decision section for determining that a sensor failure of the automobile temperature sensor is present when the elapsed time reaches a predetermined time duration. A sensor-failure decision system may further comprise an operating condition decision section adapted to receive a throttle-opening indicative signal from a throttle opening sensor and an engine-speed indicative signal from an engine speed sensor, for comparing a value of the throttle-opening indicative signal with a criterion for a throttle opening and comparing a value of the engine-speed indicative signal with a criterion for an engine speed, and wherein the measurement section executes a measurement of the elapsed time only when the value of the throttle-opening indicative signal is above the criterion for a throttle opening and the value of the engine-speed indicative signal is above the criterion for an engine speed. Alternatively, a sensor-failure decision system may further comprise an operating condition decision section adapted to receive a throttle-opening indicative signal from a throttle opening sensor, an engine-speed indicative signal from an engine speed sensor and a vehicle-speed indicative signal from a vehicle speed sensor, for comparing a value of the throttle-opening indicative signal with a criterion for a throttle opening and comparing a value of the engine-speed indicative signal with a criterion for an engine speed and comparing a value of the vehicle-speed indicative signal with a criterion for a vehicle speed, and wherein the measurement section executes a measurement of the elapsed time only when the value of the throttle-opening indicative signal is above the criterion for a throttle opening and the value of the engine-speed indicative signal is above the criterion for an engine speed and the value of the vehicle speed indicative signal is above the criterion for a vehicle speed. It is preferable that the predetermined time duration necessary for determination of sensor-failure is set at every partitioned temperature regions, and a predetermined time duration associated with the lower one of two adjacent regions of the partitioned temperature regions is set to be longer than a predetermined time duration associated with the higher one of the two adjacent regions.

DESCRIPTION OF THE PREFERRED EMBODIMENTS

Figure 1:
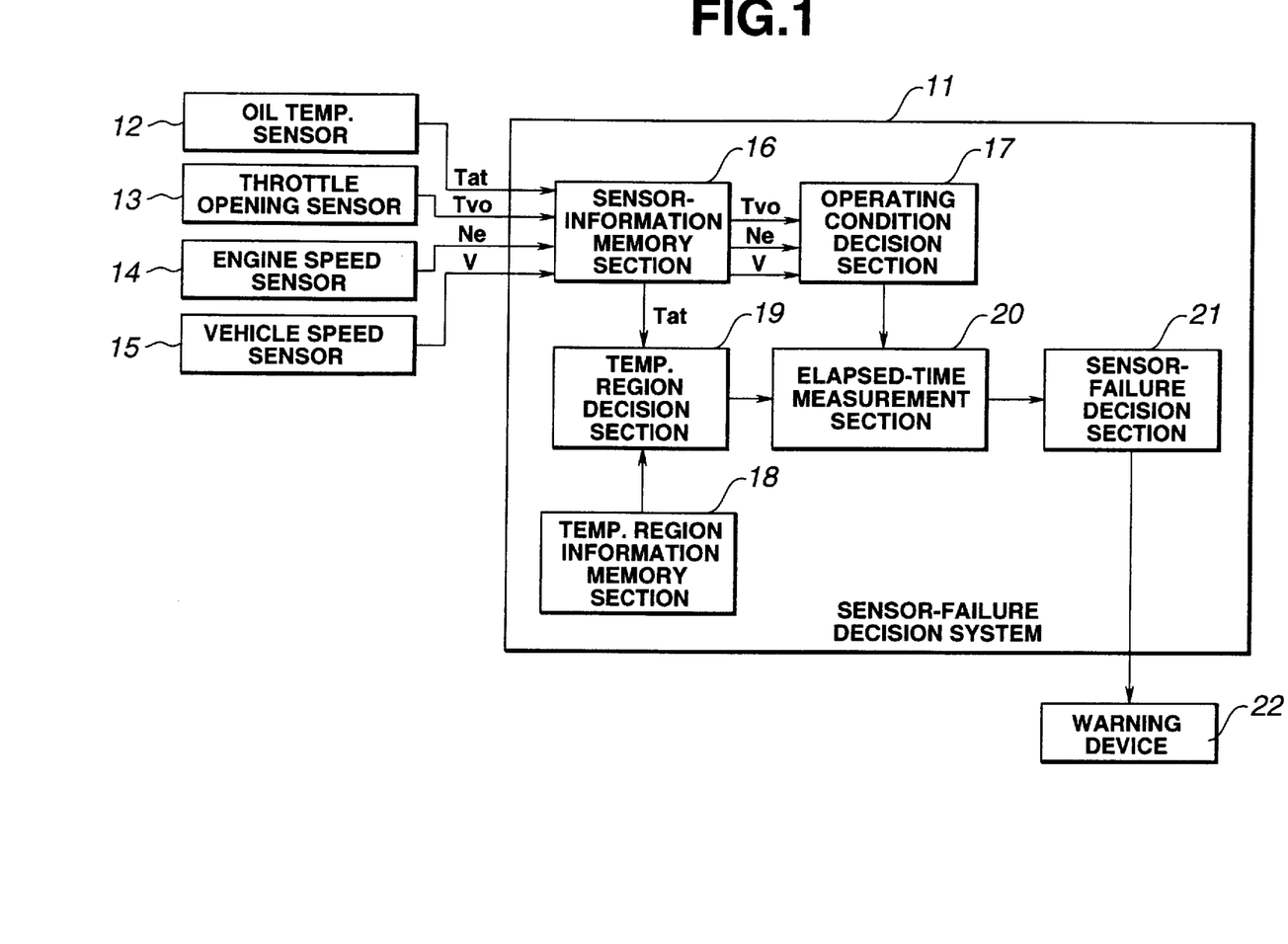
FIG. 1 is a block diagram illustrating one embodiment of a decision system for determining a sensor failure of an automobile temperature sensor, made according to the invention.

Referring now to the drawings, particularly to FIG. 1, in the decision system (or the diagnostic system) of the embodiment, an oil temperature sensor 12 is exemplified as a diagnosis item. As seen in FIG. 1, the input/output interface of the sensor-failure decision system 11 of the embodiment is connected to various sensors namely an oil temperature sensor 12, a throttle-opening sensor 13, an engine speed sensor 14 and a vehicle speed sensor 15, to receive sensor input data. In the shown embodiment, the sensor-failure decision system 11 includes at least a central processing unit (CPU), a random access memory (RAM), a read only memory (ROM) and an input/output interface, in a conventional manner. The oil temperature sensor 12 is provided for detecting a temperature $T_{at}$ of working oil used in an automatic transmission corresponding to an automotive power-train component. The sensor-failure decision system 11 is comprised of a sensor-information memory section 16, an operating-condition decision section 17, a temperature-region information memory section 18, a temperature-region decision section 19, an elapsed-time measurement section 20, and a sensor-failure decision section 21. The sensor-information memory section 16 (constructing part of the input/output interface) is provided for temporarily storing a value $T_{at}$ of an oil-temperature indicative signal from the oil temperature sensor 12, a value $T_{vo}$ of a throttle opening indicative signal from a throttle-opening sensor 13, a value Ne of an engine speed indicative signal from an engine speed sensor 14 and a value V of a vehicle speed indicative signal from a vehicle speed sensor 15. The operating-condition decision section 17 is provided for determining the operating condition of the vehicle on the basis of the throttle-opening indicative signal value $T_{vo}$ and the engine speed indicative signal value Ne, and/or the vehicle speed indicative signal value V. The operating-condition decision section 17 functions like a comparator through which the detected throttle opening $T_{vo}$ is compared with a predetermined criterion such as ⅛ and the detected engine speed Ne is compared with a predetermined criterion such as 450 rpm to determine whether a predetermined operating condition (that will cause a temperature rise of the working oil) is satisfied or unsatisfied, as will be fully described later. The temperature-region information memory section 18 is provided for memorizing a preset or predetermined normal oil-temperature region information, a plurality of partitioned temperature-regions information (which partitioned temperature-regions are obtained by partitioning a specified temperature region being lower than and continuous with the predetermined normal oil-temperature region into a plurality of temperature regions), and a predetermined time duration information (which predetermined time duration $TC_{set}$ is used for a sensor-failure decision as will be fully described later). The temperature-region decision section 19 is provided for determining what region of the plural partitioned temperature regions corresponds to a temperature region involving the oil temperature $T_{at}$ detected currently. The elapsed-time measurement section 20 is provided for measuring an elapsed time during which the detected oil temperature $T_{at}$ is continually involved in either one of the partitioned temperature regions. The elapsed-time measurement section 20 includes a timer (preferably a subtraction timer). The sensor-failure decision section 21 is provided for determining whether or not the elapsed time has been reached the previously-noted predetermined time duration $TC_{set}$ and for determining that a sensor failure is present at the time when the predetermined time duration becomes reached. The system of the preferred embodiment is designed to perform a warning operation through a warning device 22, in accordance with the warning control routine shown in FIG. 3. The temperature-region information memory section 18 is comprised of a read only memory (ROM). The predetermined normal oil-temperature region information and the partitioned temperature-regions information, and the predetermined time duration information are all permanently stored in the ROM. The ROM unit is nonvolatile. Alternatively, an electrical erasable read only memory (EEROM) may be used instead of a ROM, so that the memory can be erased and new information can be programmed into the device if necessary. In the shown embodiment, for example, the plural partitioned temperature-regions information shown in the following Table 1 is stored in memory addresses of the ROM. The temperature region denoted by "A" corresponds to a temperature region ranging less than −20° C. The temperature region denoted by "B" corresponds to a temperature region ranging equal to or greater than −20° C. and less than 0° C. The temperature region denoted by "C" corresponds to a temperature region ranging equal to or greater than 0° C. and less than 20° C. The temperature region denoted by "D" corresponds to a temperature region ranging equal to or greater than 20° C. and less than 180° C. The temperature region denoted by "E" corresponds to a temperature region ranging equal to or greater than 180° C.

TABLE 1

| Temp. Region | Oil Temp. (Tat) |
| --- | --- |
| A | Tat < −20° C. |
| B | −20° C. < Tat < 0° C. |
| C | 0° C. < Tat < 20° C. |
| D | 20° C. < Tat < 180° C. |
| E | 180° C. < Tat |

In case of the system of the embodiment, the D region (20° C.$\leq T_{at}<$180° C.) is regarded as a predetermined normal oil temperature region. Generally, the viscosity of the working oil used in the automatic transmission is comparatively stable at or in the vicinity of the lower limit (i.e., 20° C.) of the predetermined normal oil temperature region. Thus, the temperature region closer to the lower limit (20° C.) of the D region is suitable for various diagnoses or tests or checks. In the embodiment, although the temperature region below the lower limit (20° C.) of the D region (the predetermined normal oil temperature region) is partitioned into three temperature regions A, B and C, the region may be further fractionized to enhance an accuracy of detection of a sensor failure of the temperature sensor. Also, although the upper limit of the normal oil temperature region is set at 180° C., while the lower limit is set at 20° C., it will be appreciated that upper and lower limits of the normal oil temperature region may be properly varied depending on a sort of working fluid used in the automatic transmission or a coefficient of viscosity of the working fluid (working oil) or characteristics of a thermistor attached to the transmission as a temperature sensor.

Figure 2:
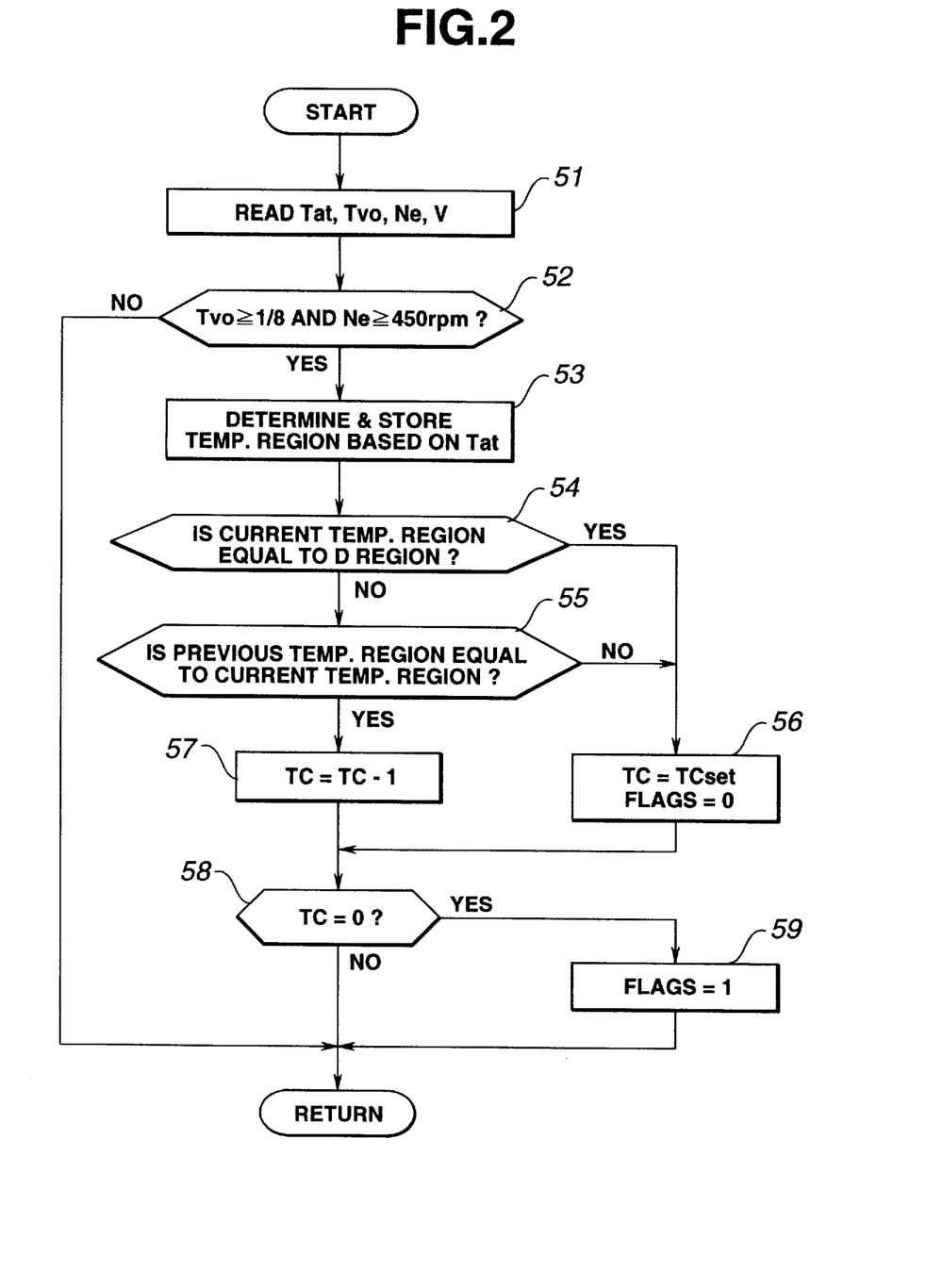
FIG. 2 is a flow chart illustrating a sensor-failure decision routine executed by the decision system of the embodiment shown in FIG. 1.

Referring now to FIG. 2, there is shown a sensor-failure decision routine executed by the system of the embodiment. The decision routine is executed as time-triggered interrupt routines to be triggered every predetermined intervals. In step 51, read are signal values from the sensors 12 through 14, namely the oil temperature $T_{at}$, the throttle opening $T_{vo}$, the engine speed Ne, and the vehicle speed V. Subsequently to the above, in step 52, a test is made to determine whether a specified condition is satisfied, that is the throttle opening indicative signal value $T_{vo}$ is above ⅛ and additionally the engine speed indicative signal value Ne is above 450 rpm being concerned with coasting of the vehicle. When the answer to step 52 is affirmative (YES), step 53 proceeds. On the contrary, when the answer to step 52 is negative (NO), the procedure skips to the first step 51. The predetermined value ⅛ of the throttle opening $T_{vo}$ and the predetermined value 450 of the engine speed Ne are criteria necessary to determine whether an operating condition based on the current sensor input data satisfies a predetermined operating condition that will cause a temperature rise of the working oil. Therefore, only when the predetermined operating condition defined in step 52 is satisfied, the next step (step 53) enters and the system begins the elapsed-time measurement as discussed later. In step 53, a test is made to determine what region of the predetermined partitioned temperature regions A, B, C, D and E corresponds to a temperature region involving the detected oil temperature $T_{at}$ read through the current interrupt routine. The results of decision made at step 53 are temporarily stored in the memory. When starting with a cold engine, the oil temperature $T_{at}$ of the working fluid in the automatic transmission usually tends to be included in either one of the relatively low three temperature regions A, B and C. The lower an ambient temperature, the lower the detected oil temperature $T_{at}$. With a lower ambient temperature, the detected oil temperature tends to be included in the B region rather than the C region or in the A region rather than the B region. Therefore, there is less possibility that the system determines that the detected oil temperature $T_{at}$ is included in the D region (the predetermined normal oil temperature region) just after the sensor-failure decision routine starts, for example during a cold engine start. For the reasons set out above, when a test is made to determine as to whether the detected oil temperature $T_{at}$ is included in the D region in step 54, the answer to step 54 is generally negative (NO) just after the process of step 53 (that is at the beginning of the decision routine of FIG. 2). Therefore, during a cold engine start, the routine tends to flow from step 54 to step 55. In step 55, a test is made to determine whether the previous temperature region decision data (the previous temperature region information data which is obtained through the previous interrupt routine executed one cycle before) is equal to the current temperature region decision data (the current temperature region information data which is obtained through the current interrupt routine). As may be appreciated, in case that the current routine is an initial or first interrupt routine and thus there is no temperature region information data stored in the memory, or when the temperature region involving the detected oil temperature $T_{at}$ is shifted up from a certain temperature region (either one of the regions A, B, C and D) by one stage owing to a rise in the detected oil temperature $T_{at}$, the answer to step 55 becomes negative (NO). In contrast to the above, in the case that the detected oil temperature $T_{at}$ is continually included in the same temperature region, the answer to step 55 becomes affirmative (YES). When the answer to step 55 is negative or the answer to step 54 is affirmative, step 56 proceeds in which a counted value TC of the timer constructing the elapsed-time measurement section 20 is set at a predetermined value $TC_{set}$ (selected as a predetermined time duration required for the sensor-failure decision), and simultaneously a sensor-failure indicative flag FLAGS is cleared to "0". In the shown embodiment, the predetermined value $TC_{set}$ is preset at a value equivalent to 10 minutes. The predetermined time duration ($TC_{set}$) required for the sensor-failure decision will be hereinafter referred to as a "sensor-failure decision time duration". In the event that the answer to step 55 is affirmative, step 57 enters in which the counted value TC of the timer is counted down or decremented by "1". The counting-down operation is repeatedly executed when the specified condition ($T_{vo} \geq$ ⅛ and Ne$\geq$450 rpm) shown in step 52 is satisfied and the detected oil temperature $T_{at}$ is maintained continually at the same temperature region (see step 55) other than the D region (see step 54). During the interrupt operation, as soon as the specified condition defined in step 52 becomes unsatisfied, the counted value TC of the timer retains unchanged. The steps 55, 56 and 57 cooperate with each other to measure an elapsed time while all of the predetermined conditions (the affirmative answer to step 52, the negative answer to step 54 and the affirmative answer to step 55) are continuously satisfied at every time-triggered interrupt routines. After steps 56 and 57, step 58 enters in which a test is made to determine whether the counted value of the timer reaches "0". If the answer to step S58 is affirmative (YES), step 59 proceeds in which the sensor-failure indicative flag FLAGS is set at "1" to signal that the sensor failure is present. On the other hand, in the event that the answer to step 58 is negative (NO) and the counted value TC of the timer does not yet reach "0", the current interrupt routine terminates and then a new interrupt routine starts after the predetermined time interval. The steps 58 and 59 function as a final sensor-failure decision process.

Figure 3:
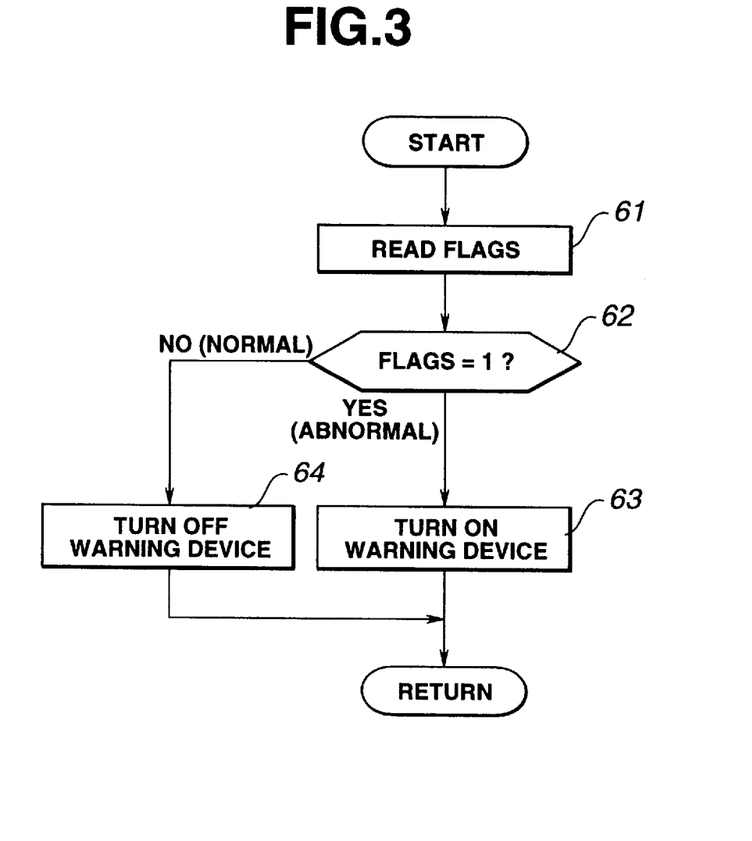
FIG. 3 is a flow chart illustrating a warning control routine associated with the sensor-failure decision routine shown in FIG. 2.

Referring now to FIG. 3, there is shown a warning-control routine based on the results of the sensor-failure decision routine shown in FIG. 2. In FIG. 3, first of all, the sensor-failure indicative flag FLAGS is read at step 61. Then, in step 62, a test is made to determine whether the FLAGS is set at "1" or reset at "0". When the answer to step 62 is affirmative (YES), that is, in case of FLAGS=1, step 63 enters in which the warning device 22 is activated and thus an alarm (a buzzing sound) is emitted and/or a warning lamp is flushed on and off. Conversely, when the answer to step 62 is negative (NO), that is, in case of FLAGS=0, step 64 enters in which the warning device is held deactivated. According to the warning-control routine of FIG. 3, the warning device remains turned ON until the cause of the sensor failure is removed and thus the flag FLAGS is reset to "0".

Figure 4:
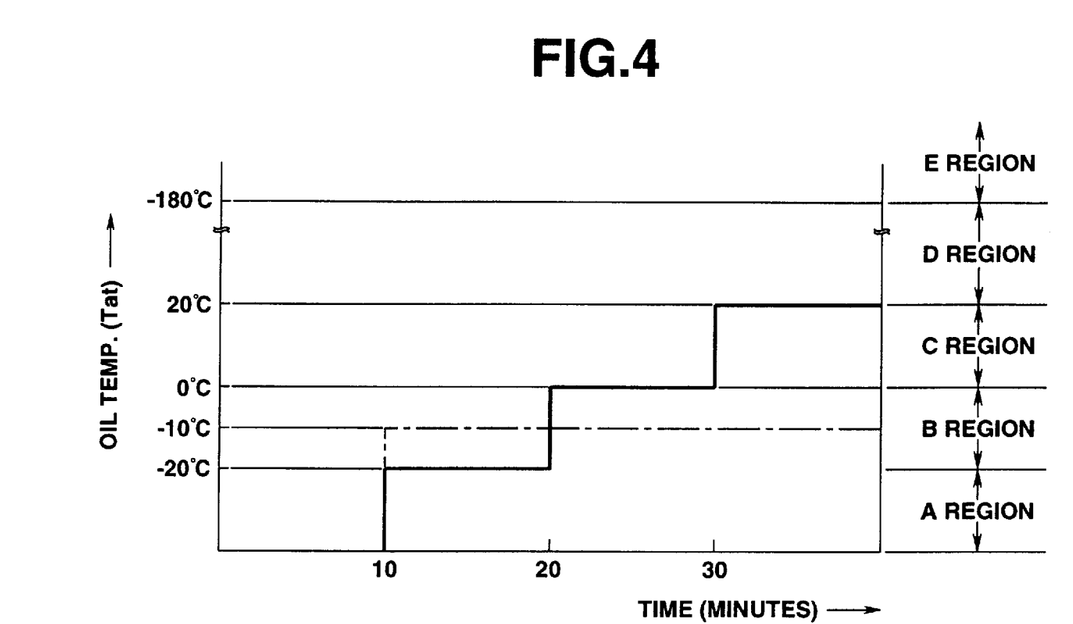
FIG. 4 is a timing chart used for explanations of how the sensor-failure decision system of the embodiment is different from the prior art system.

The operation of the sensor-failure decision system of the embodiment is hereinafter described in detail by reference to the timing chart shown in FIG. 4, comparing the control operation of the system of the invention with that of the prior art system.

For example when starting with a cold engine at the oil temperature $T_{at}$ (of working oil used in the automatic transmission) of $-30°$ C., the detected oil temperature $T_{at}$ generally tends to rise moderately up to $-20°$ C. just after the cold engine start. Thereafter, the detected oil temperature $T_{at}$ tends to rise rapidly up to $0°$ C., and then the detected oil temperature begins to moderately rise again. In case of such a standard pattern of changes in the detected oil temperature $T_{at}$, the conventional sensor-failure decision logic of the prior art system can be represented or indicated by the one-dotted line of FIG. 4. That is, the prior art system has determined that a sensor failure is present when the detected oil temperature of an oil temperature sensor is continued below a lower limit ($-10°$ C.) of a preset normal oil temperature region ($-10°$ C. through $180°$ C.) programmed into a memory device of the prior art system for a predetermined time duration such as 10 minutes. As discussed previously, according to the conventional sensor-failure decision logic, in the event that the temperature sensor such as a thermistor has broken with a resistance value equivalent to a certain temperature (for example $-5°$ C.) included within the preset normal oil temperature region of $-10°$ C. to $180°$ C., the prior art system cannot accurately detect the sensor failure. On the contrary, according to the system of the embodiment, in the case that the counted value TC of the timer becomes zero through the counting-down operation indicated in step 58 after a count value TC of the timer has been set at a predetermined time duration $TC_{set}$ (e.g., 10 minutes) at step 56 under a specified condition ($T_{vo} \geq \frac{1}{8}$ and $Ne \geq 450$ rpm) defined in step 52, that is in the case that the detected oil temperature $T_{at}$ is continued within either one of the three temperature regions A, B and C below the D region being defined as a predetermined normal oil temperature region programmed into the memory device (ROM) of the improved system of the embodiment, for a predetermined time duration such as 10 minutes), the sensor failure can be detected reliably through the flow from step 58 to step 59 to warn the vehicle occupant or the driver that the temperature sensor does not operate accurately.

As can be appreciated from the above, according to the sensor-failure decision logic of the system of the embodiment, as indicated by the stepwise solid line of in FIG. 4, the presence of the sensor failure is decided in case that a particular state that the detected oil temperature $T_{at}$ of the temperature sensor 12 is included within either one of the three partitioned temperature regions A, B and C less than the lower limit ($20°$ C.) of the preset normal oil temperature region (corresponding to the D region ($20°$ C.–$180°$ C.) and programmed into the memory device (ROM) of the system of the embodiment), is satisfied for a predetermined time duration (e.g., 10 minutes). Thus, on the assumption that the detected temperature $T_{at}$ is $-30°$ C. when starting with a cold engine, according to the sensor-failure decision logic of the system of the embodiment the presence of sensor failure can be detected, in the case (i) that the detected oil temperature $T_{at}$ is equal to a certain temperature included within the A temperature region ($T_{at} < -20°$ C.) after a predetermined time duration (10 minutes) has been elapsed from a cold engine start, in the case (ii) that the detected oil temperature $T_{at}$ is equal to a certain temperature included within the B temperature region ($-20°$ C. $\leq T_{at} < 0°$ C.) after a predetermined time duration (20 minutes) has been elapsed from the cold engine start, and in the case (iii) that the detected oil temperature $T_{at}$ is equal to a certain temperature included within the C temperature region ($0°$ C. $\leq T_{at} < 20°$ C.) after a predetermined time duration (30 minutes) has been elapsed from the cold engine start. As discussed above, the system of the embodiment can determine or make a diagnosis on a sensor failure even when the temperature sensor 22 has broken with a resistance value equivalent to a certain temperature (for example $10°$ C.) included within a given temperature region (e.g., $-10°$ C. to $20°$ C.) close to the lower limit (e.g., $20°$ C.) of the preset normal oil temperature region (programmed into the memory of the system of the embodiment and corresponding to $20°$ C. to $180°$ C.). This enhances an accuracy of decision (diagnosis) of a sensor failure.

Figure 5:
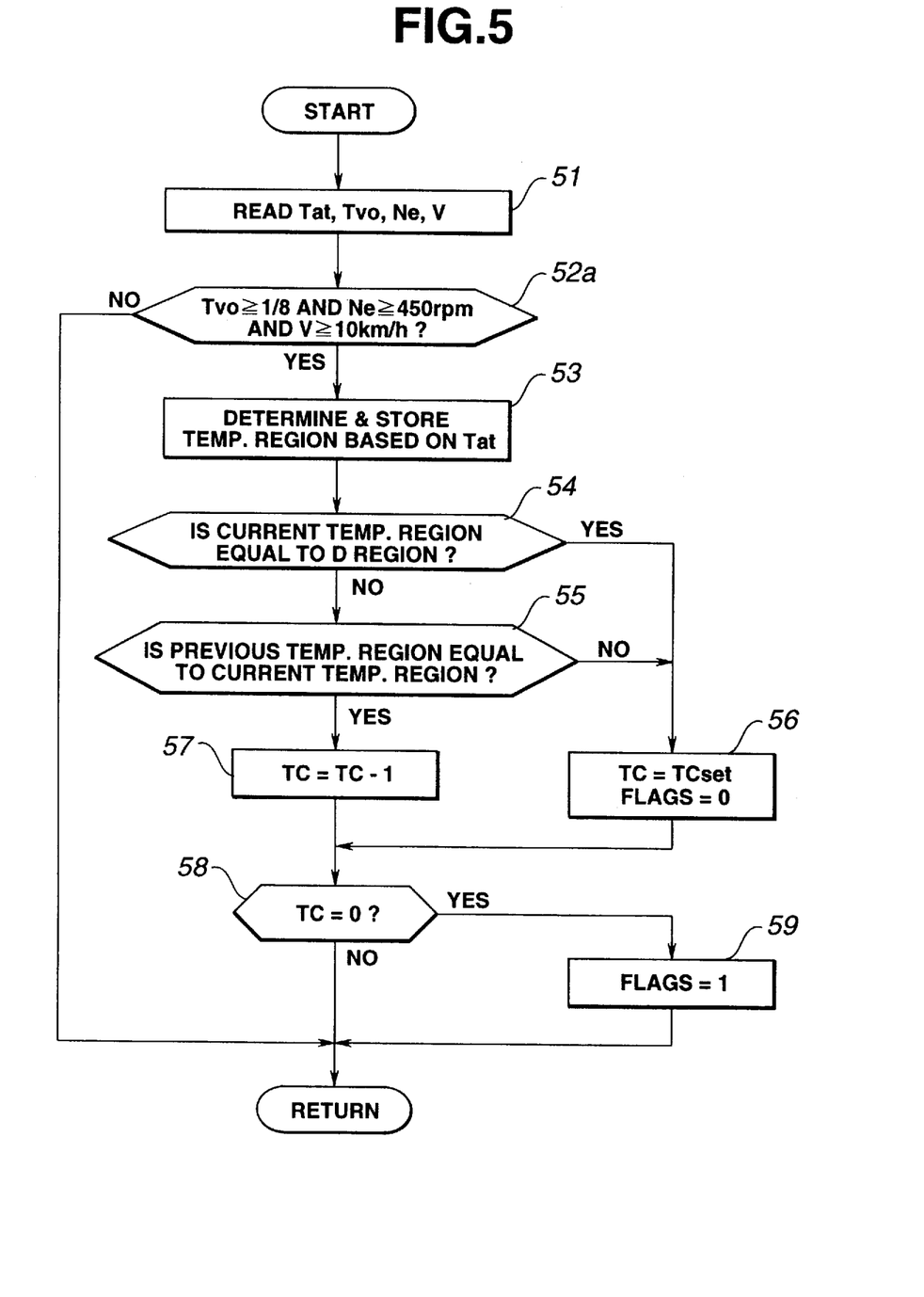
FIG. 5 is a flow chart illustrating a modified sensor-failure decision routine.

Referring now to FIG. 5, there is shown a modification of a sensor-failure decision routine. The modified processing shown in FIG. 5 is also executed as time-triggered interrupt routines to be triggered every predetermined time intervals. The modified processing of FIG. 5 is similar to the routine of FIG. 2, except that step 52 (included in the routine of FIG. 2) is replaced with step 52a (included in the routine of FIG. 5). Thus, the same step numbers used to designate steps in the routine shown in FIG. 2 will be applied to the corresponding step numbers used in the modified processing shown in FIG. 5, for the purpose of comparison of the two different interrupt routines. Step 52 will be hereinafter described in detail with reference to the accompanying drawings, while detailed description of steps 51, and 53 through 59 will be omitted because the above description thereon seems to be self-explanatory.

As appreciated from comparison of step 52a of FIG. 5 with step 52 of FIG. 2, the throttle opening $T_{vo}$ above ⅛ and the engine speed Ne above 450 rpm are used as criteria (See the condition of $T_{vo} \geq \frac{1}{8}$ and $Ne \geq 450$ rpm in step 52) in the routine of FIG. 2, whereas the vehicle speed V above 10 Km/h is also used as a criterion in addition to the two criteria of $T_{vo} \geq 1/8$ and Ne≧450 rpm in the routine of FIG. 5. According to the modified routine of FIG. 5, the procedure shifts from step 52a to step 53 only when the three conditions of $T_{vo} \geq 1/8$, Ne≧450 rpm and V≧10 Km/h are all satisfied simultaneously. Therefore, if either one of the three conditions of $T_{vo}$24 1/8, Ne≧450 rpm and V≧10 Km/h are unsatisfied, the procedure skips all of steps 53–59. As a consequence, if the condition of V≧10 Km/h is unsatisfied at step 52a, that is in case of V<10 Km/h owing to traffic congestion just after a cold engine start, the system never performs the counting-down operation of step 57, even if the detected oil temperature $T_{at}$ is continued within either one of the three temperature regions A, B and C. This prevents the sensor-failure decision routine from being influenced by traffic congestion or the like.

In the shown embodiments, the predetermined time duration $TC_{set}$ necessary for the sensor-failure decision is set at the same time interval such as 10 minutes irrespective of what region of the three partitioned temperature regions A, B and C (below the lower limit of the preset normal oil temperature region corresponding to the D region) corresponds to a temperature region involving the detected oil temperature $T_{at}$. To enhance the accuracy of decision or diagnosis for a sensor failure, it is preferable that a sensor-failure decision time duration concerned with the lower one of two adjacent regions of the three partitioned temperature regions is set to be longer than a sensor-failure decision time duration concerned with the higher one of the two adjacent regions.

While the foregoing is a description of the preferred embodiments carried out the invention, it will be understood that the invention is not limited to the particular embodiments shown and described herein, but that various changes and modifications may be made without departing from the scope or spirit of this invention as defined by the following claims.

What is claimed is:

1. A sensor-failure decision system for determining a sensor failure of an automobile temperature sensor mounted on an automobile to detect a temperature of an automotive power train, comprising:
    a first memory section adapted to receive input information indicative of a temperature of the automotive power train detected by the automobile temperature sensor;
    a second memory section for storing a predetermined normal temperature region and a plurality of predetermined partitioned temperature regions which are obtained by partitioning a specified temperature region being lower than and continuous with said predetermined normal temperature region into a plurality of temperature regions;
    a measurement section for measuring an elapsed time during which the temperature detected by the automobile temperature sensor is continually included in either one of said plurality of predetermined partitioned temperature regions; and
    a sensor-failure decision section for determining that a sensor failure of the automobile temperature sensor is present when said elapsed time reaches a predetermined time duration.

2. A sensor-failure decision system as claimed in claim 1, which further comprises an operating condition decision section adapted to receive a throttle-opening indicative signal from a throttle opening sensor and an engine-speed indicative signal from an engine speed sensor, for comparing a value of said throttle-opening indicative signal with a criterion for a throttle opening and comparing a value of said engine-speed indicative signal with a criterion for an engine speed, and wherein said measurement section executes a measurement of said elapsed time only when the value of said throttle-opening indicative signal is above said criterion for a throttle opening and the value of said engine-speed indicative signal is above said criterion for an engine speed.

3. A sensor-failure decision system as claimed in claim 1, which further comprises an operating condition decision section adapted to receive a throttle-opening indicative signal from a throttle opening sensor, an engine-speed indicative signal from an engine speed sensor and a vehicle-speed indicative signal from a vehicle speed sensor, for comparing a value of said throttle-opening indicative signal with a criterion for a throttle opening and comparing a value of said engine-speed indicative signal with a criterion for an engine speed and comparing a value of said vehicle-speed indicative signal with a criterion for a vehicle speed, and wherein said measurement section executes a measurement of said elapsed time only when the value of said throttle-opening indicative signal is above said criterion for a throttle opening and the value of said engine-speed indicative signal is above said criterion for an engine speed and the value of said vehicle speed indicative signal is above said criterion for a vehicle speed.

4. A sensor-failure decision system as claimed in claim 1, wherein said predetermined time duration necessary for determination of sensor-failure is set at every partitioned temperature regions, and wherein a predetermined time duration associated with the lower one of two adjacent regions of said partitioned temperature regions is set to be longer than a predetermined time duration associated with the higher one of said two adjacent regions.

5. A sensor-failure decision system for determining a sensor failure of an automobile temperature sensor mounted on an automobile to detect a temperature of working fluid used in an automotive power train, said system comprising:
    a first memory means connected to the automobile temperature sensor for receiving input information indicative of a temperature of working fluid used in the automotive power train;
    a second memory means for storing a predetermined normal temperature region and a plurality of predetermined partitioned temperature regions which are obtained by partitioning a specified temperature region being lower than and continuous with said predetermined normal temperature region into a plurality of temperature regions; and
    a decision means for determining that a sensor failure is present when the temperature detected by the automobile temperature sensor is continually included in either one of said plurality of predetermined partitioned temperature regions for a predetermined time duration.

6. A sensor-failure decision system as claimed in claim 5, which further comprises an operating condition decision means adapted to be connected to a throttle opening sensor and an engine speed sensor for receiving a throttle-opening indicative signal and an engine-speed indicative signal, and for comparing a value of said throttle-opening indicative signal with a criterion for a throttle opening and comparing a value of said engine-speed indicative signal with a criterion for an engine speed, and wherein said predetermined time duration is counted only when a first necessary condition that the value of said throttle-opening indicative signal is above said criterion for a throttle opening and a second necessary condition that the value of said engine-speed indicative signal is above said criterion for an engine speed are satisfied simultaneously.

7. A sensor-failure decision system as claimed in claim 5, which further comprises an operating condition decision means adapted to be connected to a throttle opening sensor, an engine speed sensor and a vehicle speed sensor for receiving a throttle-opening indicative signal, an engine-speed indicative signal and a vehicle-speed indicative signal, and for comparing a value of said throttle-opening indicative signal with a criterion for a throttle opening, and comparing a value of said engine-speed indicative signal with a criterion for an engine speed and comparing a value of said vehicle-speed indicative signal with a criterion for a vehicle speed, and wherein said predetermined time duration is counted only when a first necessary condition that the value of said throttle-opening indicative signal is above said criterion for a throttle opening and a second necessary condition that the value of said engine-speed indicative signal is above said criterion for an engine speed and a third necessary condition that the value of said vehicle-speed indicative signal is above said criterion for a vehicle speed are all satisfied simultaneously.

8. A sensor-failure decision system as claimed in claim 5, wherein said predetermined time duration necessary for determination of sensor-failure is set at every partitioned temperature regions, and wherein a predetermined time duration associated with the lower one of two adjacent regions of said partitioned temperature regions is set to be longer than a predetermined time duration associated with the higher one of said two adjacent regions.

* * * * *